Dec. 18, 1951     T. A. WOOLSEY ET AL     2,579,104
CLAMP
Filed June 22, 1945     2 SHEETS—SHEET 1
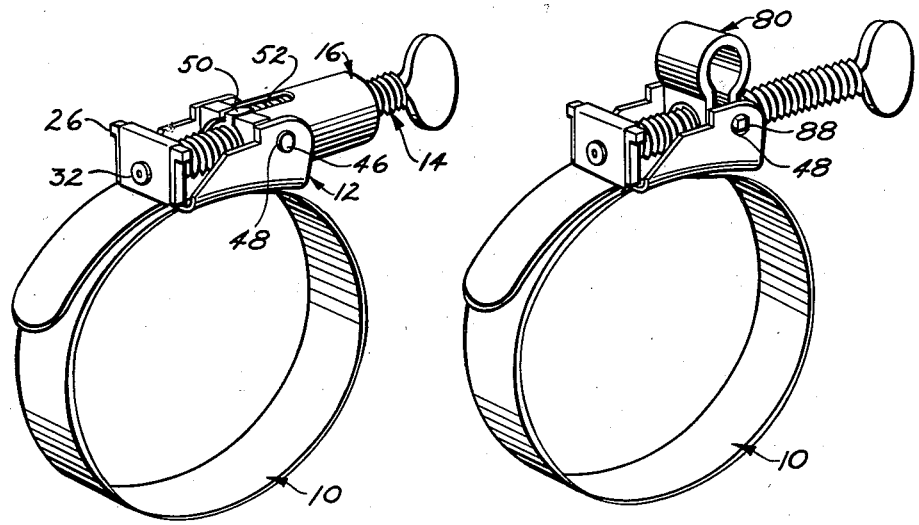
Fig. 1     Fig. 3
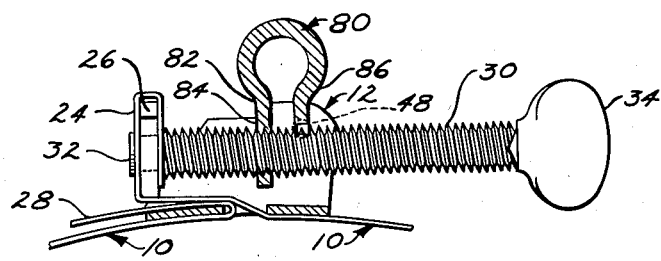
Fig. 8
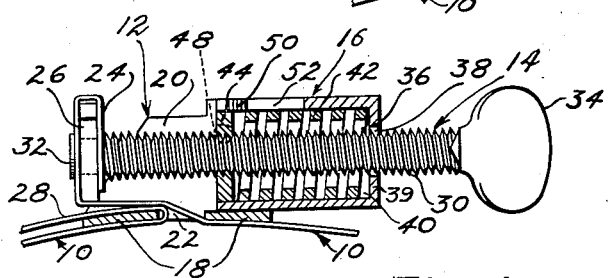
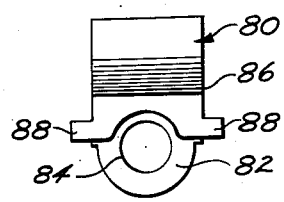
Fig. 4     Fig. 9
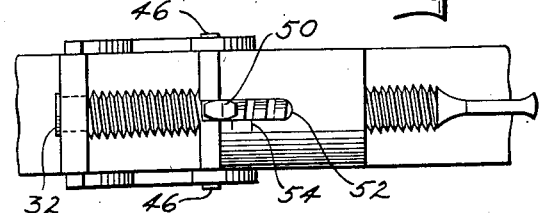
Fig. 5
INVENTOR.
Theodore A. Woolsey and
Howard D. Houghton
BY
Edwin Coates
ATTORNEY Dec. 18, 1951  T. A. WOOLSEY ET AL  2,579,104
CLAMP
Filed June 22, 1945  2 SHEETS—SHEET 2
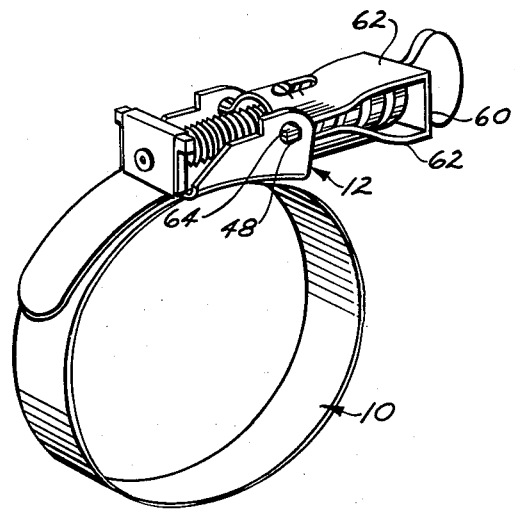
Fig. 2
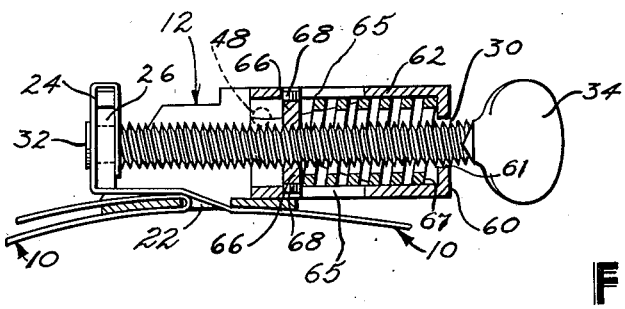
Fig. 6
Fig. 7
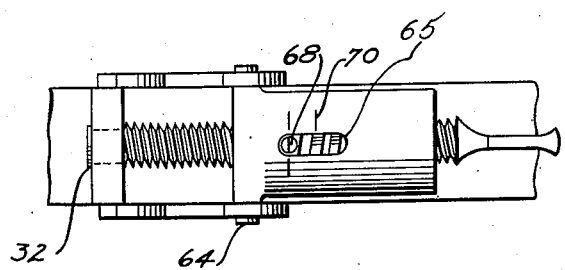
INVENTOR.
Theodore A. Woolsey and
Howard D. Houghton
BY
J. Edwin Coates
ATTORNEY Patented Dec. 18, 1951

2,579,104

UNITED STATES PATENT OFFICE 2,579,104

CLAMP

Theodore A. Woolsey, Pasadena, and Howard D. Houghton, Los Angeles, Calif., assignors to Marman Products Company, Inc., Inglewood, Calif.

Application June 22, 1945, Serial No. 601,041

4 Claims. (Cl. 24—19)

This invention relates to the art of hose clamps and more particularly to that class of hose clamps used on systems carrying liquids at greatly varying temperatures and pressures.

Present day liquid cooled automotive power plants, such as liquid cooled aircraft engines, impose severe requirements on their cooling systems. The use of chemical coolants, such as ethylene glycol, allows operation of the engine at temperatures well in excess of the boiling point of water. The great amount of heat rejected by the engine requires very rapid circulation which in turn calls for comparatively high pressures in the coolant system. At the same time the extremely low viscosity of ethylene glycol and other special coolants increases the leakage tendency, and the sealing problem is correspondingly greater.

The positive adjustment type of hose clamp now in use is adequate to initially clamp a hose in leakproof engagement with a pipe or tube to which it is connected, but the increase from atmospheric temperature and pressure to the operating temperature and pressure of the engine results in expansion of the hose adjacent to the clamp. Since the clamp is unyielding and the hose is more plastic than elastic, the result is flow of the material of the hose, commonly called "cold flow." After operation, the reduction of temperature and pressure allows the hose to contract. Since some of the material of the hose has flowed out from under the clamp the connection becomes loose and leakage ensues unless the clamp is again tightened. Repeated tightenings tend to weaken the hose and cut it apart so that frequent replacements are necessary.

The primary object of the present invention is to provide a clamp which will yield sufficiently under operating conditions to reduce or eliminate this tendency to "cold flow." This is accomplished by so constructing the clamp that the tensile load of the band is applied thru a resilient force transmitting connection without sacrificing the benefits of contacting the hose with a band of inextensible material thruout its entire periphery.

Various attempts have been made in the past to produce resilient hose clamps of one kind or another but none of them has proven satisfactory. Coil springs have been used as bands but they give interrupted contact with the hose and a good seal cannot be obtained. Coil springs entirely surrounding the clamping bands have also been tried but they are cumbersome and not readily adjustable. Moreover, they are unnecessarily heavy and cannot be made stiff enough to provide sufficient clamping pressure.

The many novel features and advantages of the hose clamp of our invention will become apparent as the description proceeds. While our clamp may take many forms, the presently preferred embodiments are shown in the accompanying drawing, in which:

Fig. 1 is a perspective view of a first form of our clamp;

Fig. 2 is a perspective view of a second form of our clamp;

Fig. 3 is a perspective view of a third form of our clamp;

Fig. 4 is a side elevation, partly in section, of the form of the invention shown in Fig. 1;

Fig. 5 is a top plan view of the clamp shown in Figs. 1 and 4;

Fig. 6 is a side elevation, partly in section, of the form of the invention shown in Fig. 2;

Fig. 7 is a top plan view of the clamp shown in Figs. 2 and 6;

Fig. 8 is a side elevation, partly in section, of the form of the invention shown in Fig. 3; and Fig. 9 is an end elevation of the form of resilient force transmitting member incorporated in the form of invention shown in Fig. 3.

Referring first to Figs. 1 and 4, our clamp comprises a band 10 adapted to circumscribe a member to be clamped, a saddle 12, a tensioning member 14, and a resilient force transmitting member 16 connecting the tensioning member to the saddle. The saddle is a rigid member made up of a bottom wall 18 and two upstanding side walls 20. The bottom wall is provided with an opening 22 thru which both ends of the band are adapted to pass, the first end 24 being folded over pad 26 and the second end 28 being bent back on itself to anchor the band to the lower wall of the saddle intermediate the ends of said band.

The tensioning member 14 includes a threaded shank 30 having a reduced end 32 which passes thru aligned apertures in the band end 24 and pad 26 and is headed over to provide a rotatable connection. The opposite end of the threaded shank is provided with a flattened head 34 for application of torque.

The resilient force transmitting member 16 comprises a cage or cylinder 36 having an aperture 38 in the end wall 39 for free passage of the threaded shank, and a bore 40 enclosing a compression spring 42, and a nut 44 having threaded engagement with the shank 30. Bosses 46 formed on the exterior of the cylinder are engaged in pivot bearings 48 in the upstanding side walls of the saddle. The nut is prevented from rotating with respect to the cylinder by a boss 50 formed integral with the nut for engagement in the slot 52 in the cylinder. Indicia 54 may be inscribed on the cylinder adjacent the slot to indicate the extent of travel of the nut.

In applying the clamp to a hose, the shank 30 is first backed off until the pad 26 is adjacent to the nut 44. The band is wrapped around the hose and the free end 28 is passed thru aperture 22 and pulled up snugly by hand. The end is then bent back as shown in Fig. 4 which provides sufficient anchorage to prevent slipping. Thereafter the screw 30 is rotated to advance pad 26 to the left which exerts circumferential tension on the band to securely clamp the hose to the pipe or tube to which it is to be attached. The pad and the band following it immediately overlie the free end 28 and prevent any possibility of unfolding.

As the band tension increases, the nut 44 tends to slide into the bore 40 but this tendency is resisted by spring 42. The strength of the spring is so selected that, when the predetermined desired tension is applied to the band, the nut will have traveled only a short distance to the right, the range being indicated by the indicia 54 shown in Fig. 5.

Since the tension force exerted on the band is applied thru the medium of the spring, it will be obvious that expansion of the hose caused by operating pressures and temperatures will expand the band slightly against the resistance of the spring and there will be little if any tendency for the hose to "cold flow." When the hose contracts, the band will follow it down and remain tight, even if a slight amount of flow has slightly reduced the base diameter of the hose. No matter how often the operating cycle of the cooling system is repeated, the clamp will expand and contract in the same way and remain tight at all times. This ability to follow variations resulting from changes in operating conditions spells the difference between success and failure in a hose clamp intended for the purpose set forth.

It will be noted that the axis of the bosses and pivot bearings is spaced radially outward of the axis of the shank 30. The eccentric loading thus created tends to force the pad 26 down against the free end 28 of the band, more securely anchoring it against slipping, and also tends to make the nut bind on the shank, which prevents it from unscrewing under vibration.

The form of clamp shown in Figs. 2, 6 and 7 is similar to the first form in all respects except that the cage is stamped out of sheet metal instead of being machined from a solid block. In its finished form it comprises an end wall 60 having an aperture 61 for free passage of shank 30, legs or side walls 62, and ears 64 at their free ends. These ends are formed into complementary arcs of a circle, and each adjacent pair of ears combines to form a boss for engagement in the pivot bearing 48 of each side wall of the saddle 12. Each of the legs or walls 62 is provided with a slot 65. Nut 66, threaded on shank 30 and bearing against coil spring 67, has two bosses 68 which engage in the slots 65. Indicia 70 are inscribed in the surface of the upper leg to indicate the extent of movement of the nut 66 under load. The application and operation of this form of the invention are the same as the first form.

Figs. 3, 8 and 9 illustrate a modification in which the resilient force transmitting member consists of a single strip of spring material 80 bent in a U shape. One leg 82 of the member is provided with a threaded aperture 84 for engagement with shank 30. The other leg 86 is forked at its end to straddle the shank 30 and is provided with a pair of ears or bosses 88 for engagement in pivot bearing 48.

This clamp is applied and operated in the same way as the two forms first described. Upon application of clamping tension, the load tends to collapse the U-shaped member but the material is stiff enough to limit the movement to a fraction of the space between the legs.

It will be seen that we have devised a hose clamp which will apply a firm but yielding pressure to the entire periphery of a hose at all times but which will permit a small amount of expansion and contraction of the hose to prevent or decrease "cold flow." While the invention has been illustrated and described in its preferred forms it will be obvious that various changes and modifications may be made within the scope of the invention and it is intended to embrace all such changes and modifications in the following claims.

We claim:

1. A band clamp comprising a flexible band to circumscribe a member to be clamped; a saddle having means engaging one end of said band and having a pair of ears spaced laterally with relation to the longitudinal axis of the band; a tensioning screw having at one end means engaging the other end of said band; a yoke shaped cage including a web having an aperture in which said screw is journalled near its other end, and having a pair of spaced arms embracing said screw and pivotally connected to said ears at their ends remote from said web; a follower nut threaded on said screw and having a slidable, non-rotatable connection with said arms; and a coil spring interposed between said nut and said web and embraced between said cage arms, for yieldingly transmitting, under compression, from said nut to said web, the pull of said screw when rotated, to constrict said band.

2. A band clamp comprising a flexible band to circumscribe a member to be clamped; a saddle having means engaging one end of said band and having a pair of ears spaced laterally with relation to the longitudinal axis of the band; a tensioning screw having at one end means engaging the other end of said band; a yoke shaped cage including a web having an aperture in which said screw is journalled near its other end, and having a pair of spaced arms embracing said screw and pivotally connected to said ears at their ends remote from said web; said arms defining a pair of slideways in diametrically opposed relation across the axis of said screw; a follower nut threaded on said screw and having a pair of extensions slidable in said slideways to permit axial movement of said nut while restraining it against rotation, and a coil spring interposed between said nut and said web and embraced between said cage arms, for yieldingly transmitting, under compression, from said nut to said web, the pull of said screw when rotated, for constricting said band.

3. A clamp as defined in claim 2, wherein said slideways comprise longitudinal slots in said arms, intermediate the lateral edges thereof; and wherein said arms have at their free end corners, trunnions extending laterally, said ears having apertures in which said trunnions are journalled to provide said pivotal connection of said arms to said ears.

4. A clamp as defined in claim 3, wherein said arms are transversely curved around said coil spring.

THEODORE A. WOOLSEY.
HOWARD D. HOUGHTON.

REFERENCES CITED

The following references are of record in the file of this patent:

UNITED STATES PATENTS

| Number | Name | Date |
|---|---|---|
| 241,099 | Walden | May 3, 1881 |
| 1,111,479 | Malleville | Sept. 22, 1914 |
| 1,412,188 | Lopdell | Apr. 11, 1922 |
| 1,487,903 | Vitek | Mar. 25, 1924 |
| 2,268,211 | Hathorn | Dec. 30, 1941 |
| 2,270,375 | King | Jan. 30, 1942 |
| 2,361,520 | Worth | Oct. 31, 1944 |
| 2,381,349 | Hagen et al. | Aug. 7, 1945 |
| 2,466,755 | Webster et al. | Apr. 12, 1949 |

FOREIGN PATENTS

| Number | Country | Date |
|---|---|---|
| 184,628 | Switzerland | Aug. 17, 1936 |
| 439,844 | Great Britain | Dec. 16, 1935 |